(12) United States Patent
Burdick

(10) Patent No.: US 8,050,963 B2
(45) Date of Patent: Nov. 1, 2011

(54) METHOD OF ASSESSING A PARKING FEE

(76) Inventor: Joshua H. Burdick, New York, NY (US)

(*) Notice: Subject to any disclaimer, the term of this patent is extended or adjusted under 35 U.S.C. 154(b) by 506 days.

(21) Appl. No.: 12/072,341

(22) Filed: Feb. 26, 2008

(65) Prior Publication Data

US 2009/0216687 A1 Aug. 27, 2009

(51) Int. Cl.
*G06Q 99/00* (2006.01)
(52) U.S. Cl. .......... 705/13; 340/932.2; 705/418
(58) Field of Classification Search .......... 705/13, 705/418; 340/932.2
See application file for complete search history.

(56) References Cited

U.S. PATENT DOCUMENTS

| | | | | |
|---|---|---|---|---|
| 4,361,202 A | * | 11/1982 | Minovitch | 180/168 |
| 5,173,692 A | * | 12/1992 | Shapiro et al. | 340/943 |
| 5,638,302 A | | 6/1997 | Gerber | |
| 6,524,412 B2 | | 2/2003 | Smith | |
| 6,698,348 B1 | | 3/2004 | Bloss | |
| 7,231,288 B2 | * | 6/2007 | Koulinitch | 701/96 |
| 2006/0212215 A1 | * | 9/2006 | Koulinitch | 701/205 |
| 2006/0232442 A1 | | 10/2006 | Vastad et al. | |
| 2007/0268157 A1 | * | 11/2007 | Hess et al. | 340/932.2 |
| 2009/0115638 A1 | * | 5/2009 | Shankwitz et al. | 340/988 |
| 2009/0146845 A1 | * | 6/2009 | Hedley | 340/936 |

FOREIGN PATENT DOCUMENTS

| | | | |
|---|---|---|---|
| JP | 401312700 A | | 12/1989 |
| JP | 06325294 A | * | 11/1994 |
| JP | 40635294 A | | 11/1994 |
| JP | 407249195 A | | 9/1995 |
| JP | 02002175595 A | | 6/2002 |
| JP | 2007026003 A | * | 2/2007 |

OTHER PUBLICATIONS

Imaizumi et al , Parking-meter supervision system, IEEE Conferences, Publication Year: 1994 , pp. 333-338.*

* cited by examiner

*Primary Examiner* — Akiba Robinson Boyce
(74) *Attorney, Agent, or Firm* — Buchanan Ingersoll & Rooney PC

(57) ABSTRACT

A method for assessing fees for parking is disclosed. The method includes determining the length of a vehicle and assessing a parking fee based upon that vehicle length. The disclosed method may also include marking at least a portion of the selected parking area in increments of length or marking the length of a vehicle on that vehicle. Embodiments of the method are also disclosed that include calculating the parking fee so that a longer vehicle is charged more than a shorter vehicle for parking in the selected parking area. Other embodiments of the disclosed method include calculating the parking fee based on different length ranges that include at least a first length range and a second length range. The first length range has lengths that are shorter than lengths in the second length range. The parking fee is based on which length range the length of the vehicle falls within.

6 Claims, 5 Drawing Sheets

METHOD OF ASSESSING A PARKING FEE

FIELD OF INVENTION

The present invention relates to the parking of vehicles and, more particularly, to calculating a parking fee for a vehicle.

BACKGROUND OF THE INVENTION

Vehicle owners are often charged for parking their vehicle in a parking lot owned by a provider of parking services or on the side of a street owned or maintained by a municipality. For example, Japanese Patents 406325294, 407249195, 041312700 and 02002175595 disclose different parking management systems. Generally, the price, or parking fee, charged for parking in a certain area is based on the amount of time a vehicle is parked. In some cases, a flat fee is charged for parking a certain number of hours, or days, in a parking lot or space. Cities and other municipalities often provide residents a parking permit for a certain fee that permits the resident to park adjacent the side of various streets in a designated area for a year.

Parking fees are also charged by parking lot providers and collected prior to a vehicle owner removing the vehicle from the parking lot. For instance, Japanese Patent 4096325294 discloses a parking management system that can be used by a parking lot provider. The disclosed system is configured to scan the length of a vehicle and, based on the sensed length, select an appropriate free parking space suitable for the length of the vehicle and provide the owner of the vehicle printed instructions to drive to the assigned parking space to park the vehicle. A parking ticket is also provided to the owner for use in paying the fee for parking his or her vehicle. When the vehicle owner is ready to remove his or her vehicle from the parking lot, the vehicle owner pays the parking fee by inserting the parking fee ticket into a parking ticket processor. The parking fee processor calculates the parking fee based on the amount of time the vehicle was parked in the parking lot. The system is configured to permit the vehicle to exit the parking lot after the parking fee is paid.

It is common also for parking to be provided along the side of a street adjacent the curb of the street. Often, cities and other municipalities offer parking along the side of a street for a fee that is charged by a parking meter. In all of these situations, the parking fee is calculated without regard to the size of the vehicle. As a result, owners of small vehicles normally pay the same amount to park in a parking lot or on a city lot as owners of large vehicles.

In many cities a lack of parking space and traffic congestion are significant problems. If drivers have incentives to drive smaller cars, the extent and severity of these problems can be reduced. If more people drove smaller cars, more cars could be parked in many lots and along many city streets. This may also result in an increase in parking fee revenues to the parking lot owner or municipality.

SUMMARY OF THE INVENTION

I provide a method to encourage drivers to drive smaller cars by assessing parking fees for parking a vehicle based upon the size of the vehicle. My method includes measuring the length of the vehicle to determine a vehicle measurement and assessing a parking fee based upon the vehicle measurement. Preferably, the parking fee is calculated so that a longer vehicle is charged more than a shorter vehicle for parking in the selected area.

Of course, the parking fee may also be based on the amount of time the vehicle is parked. Indeed, I prefer to calculate parking fees based upon both time and vehicle length. The parking fee may be collected by a parking meter or other parking fee collector.

Embodiments of my method may also include marking at least a portion of the selected parking area in increments of length. For example, one or more portions of the selected parking area may be marked in one foot increments. In one embodiment of my method, the parking fee is calculated by multiplying a certain fee by the number of markings or other incremental length indicia the parked vehicle covers.

The selected parking area may be a parking lot, a multi-level parking lot or an area adjacent one or more sides of a street. Markings to indicate length may be on the surface on which the vehicle is parked or on a curb adjacent that surface.

In some embodiments, the parking fee is charged based on two or more length ranges. The length ranges may include a first length range that includes lengths that are shorter than lengths in the second length range. Of course, more than two length ranges may be used. The parking fee may be based on which length range the length of the vehicle falls within. For example, a vehicle with a length in the second length range may be charged a parking fee that is higher than a vehicle with a length that falls within the first length range.

The selected area may be configured to permit different vehicles to park. For example, a selected parking area may be sized for parking automobiles, cars, trucks, sport utility vehicles, scooters, all terrain vehicles, motorcycles or any combination thereof.

It should be appreciated that the length of the vehicle may be measured in various ways. In one embodiment, the length of the vehicle is measured by a measurement device that includes one or more sensors operatively connected to one or more processors configured to receive input from the one or more sensors and calculate the length of the vehicle based on the input. In some embodiments, such a measurement device is connected to a parking meter. Preferably, the one or more processors are also configured to cause the parking meter to display the calculated parking fee after receiving the input from the one or more sensors. In addition, it is my intention to have the length of the vehicle indicated on the state issued registration tag or other marking on the vehicle thereby eliminating an arbitration as to the vehicle's length.

Other details, objects, and advantages of the invention will become apparent as the following description of certain present preferred methods of practicing the invention proceeds.

BRIEF DESCRIPTION OF THE DRAWINGS

In the accompanying drawings I have illustrated certain present preferred methods of practicing my method of assessing parking fees.

DETAILED DESCRIPTION OF PRESENT PREFERRED EMBODIMENTS

Figure 1:
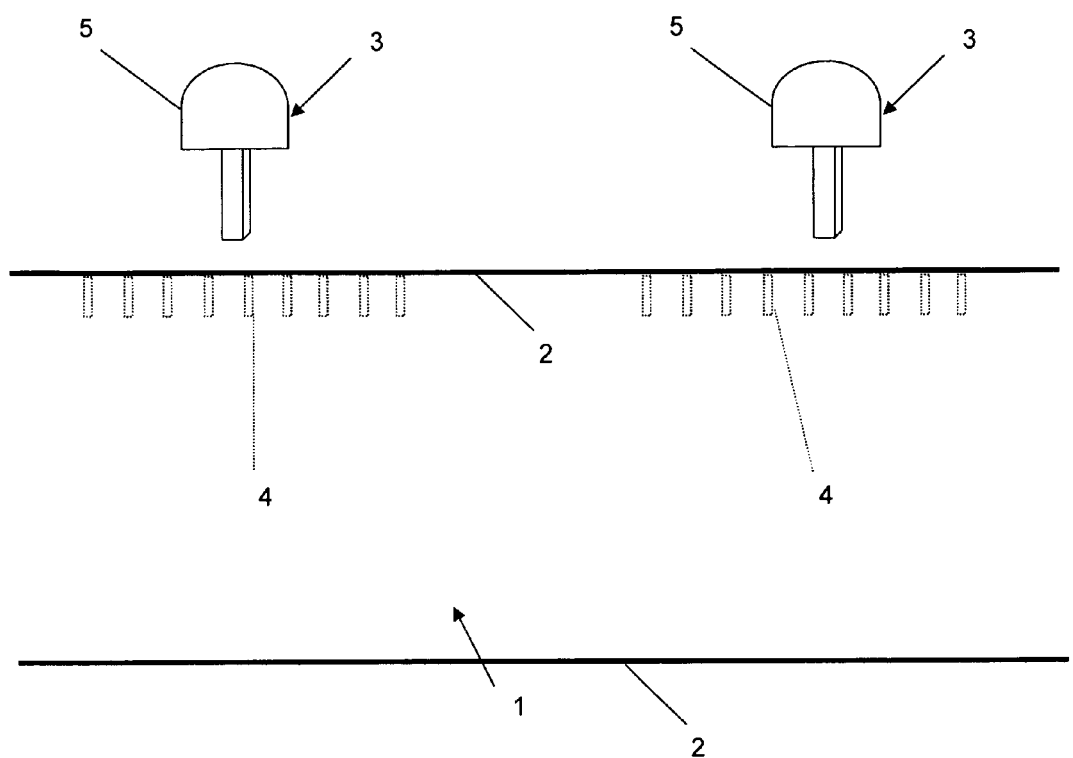
FIG. 1 is a perspective view of an embodiment of parking meters configured to collect parking fees based on the length of a vehicle.

A street 1 having a selected parking area adjacent the curb 2 of the street 1 has parking meters 3 adjacent portions of the selected parking area is shown in FIG. 1. The parking meters 3 are attached to the ground adjacent the street 1. The parking meters have a head 5 that is configured to permit a vehicle owner that parks in a portion of the selected parking area to pay a parking fee.

The head 5 of the parking meter includes a face that is configured to permit a vehicle owner to pay the parking fee. The head 5 has a display 7, a parking fee collection system 11, which may include slots for receiving cash, coins, or credit card payments, and a key pad 9. The parking meter 5 may be configured so a vehicle owner can enter data, such as vehicle length and parking duration time in the key pad. The parking meter can also be configured to calculate a parking fee based on the input provided by the vehicle owner. increments of length. Preferably, the markings identify one foot increments of length. The parking meter 3 can be configured to ask a vehicle owner to enter the number of increments the parked vehicle covers in display 9. The vehicle owner may respond by entering the number with key pad 9. Based on this input, the parking meter may calculate a flat parking fee or a parking fee that is required for a certain time segment, such as a parking fee required for every 15 minutes the vehicle owner wants to have his or her vehicle parked in the selected parking area. The vehicle owner may then pay the parking fee by placing cash in the parking fee collection portion 11 of the parking meter. The parking meter may be configured to receive only coins, or may be configured to receive paper money or credit or debit card payments in the collection portion 11.

In some embodiments, the parking meter 3 may be configured to select a parking fee based on the length range the parked vehicle falls within. For example, a parking meter may have two or more preselected length ranges that identify different parking fees. A first parking fee may be charged for vehicles that have a length that falls within a first length range and a second parking fee for vehicles that fall within a second length range. The parking meters 3 may include buttons 13 or other actuators configured to identify the length range the parked vehicle falls within. The parking meter may then identify a parking fee based on the selected length range.

Embodiments of the parking meters 3 discussed above generally require a vehicle owner to identify an accurate length of the vehicle. To permit verification that an accurate length has been identified, the display 9 may be configured to identify the length of the parked vehicle and the time remaining from the parking time paid by the vehicle owner. Such a display may permit parking mangers, meter maids, or other personnel to verify that correct payment for parking has been collected.

Yet, another way to determine the length of a vehicle being parked is to provide a marking on the vehicle itself which indicates the length of the vehicle. This marking could be a tag which reports the length of the vehicle or a letter or other symbol including a bar code that corresponds to the length of the vehicle. For example, a vehicle 15 feet long may be marked with a letter A, a 22 foot vehicle marked with letter B and a 25 foot long vehicle marked with letter C. The letter or other symbol could correspond to a single length or a range of lengths. For example, any vehicle measuring 15 feet or less may be marked with "A," vehicles greater than 15 feet but not longer than 22 feet would be marked with "B" and vehicles greater than 25 feet in length would bear a letter "C".

The marking could be contained in a vehicle registration tag issued by the state or in a parking tag issued by a municipality or parking lot operator. When such a tag is used, the length of the vehicle is determined by reading the tag rather than using a measurement device. One advantage of providing such a tag or marking on the vehicle is that no judgment or measuring skills are needed to determine the length of a vehicle bearing such a tag or marking. Another advantage is that the marking could be machine readable such as a bar code that is read by a bar code scanner.

In embodiments that use length ranges to determine a parking fee calculation, the display 9 on the parking meter may be configured to display the time remaining in a certain color that is calibrated to indicate a particular length range. For example, in embodiments that are configured to calculate a parking fee based on different length ranges, a vehicle identified as falling within a first length range may have a paid parking time remaining displayed in blue, a vehicle identified as falling within a second length range may have a paid parking time remaining displayed in red and a vehicle identified as falling within a third length range may have a paid parking time remaining displayed in green and vehicles that are identified as falling within other length ranges may have the paid parking time remaining displayed in other colors. Of course, other embodiments may be configured so that the display indicates the length of the parked vehicle by the entered measurement or by a symbol or other indicia that corresponds to a given length or length range.

Figure 2:
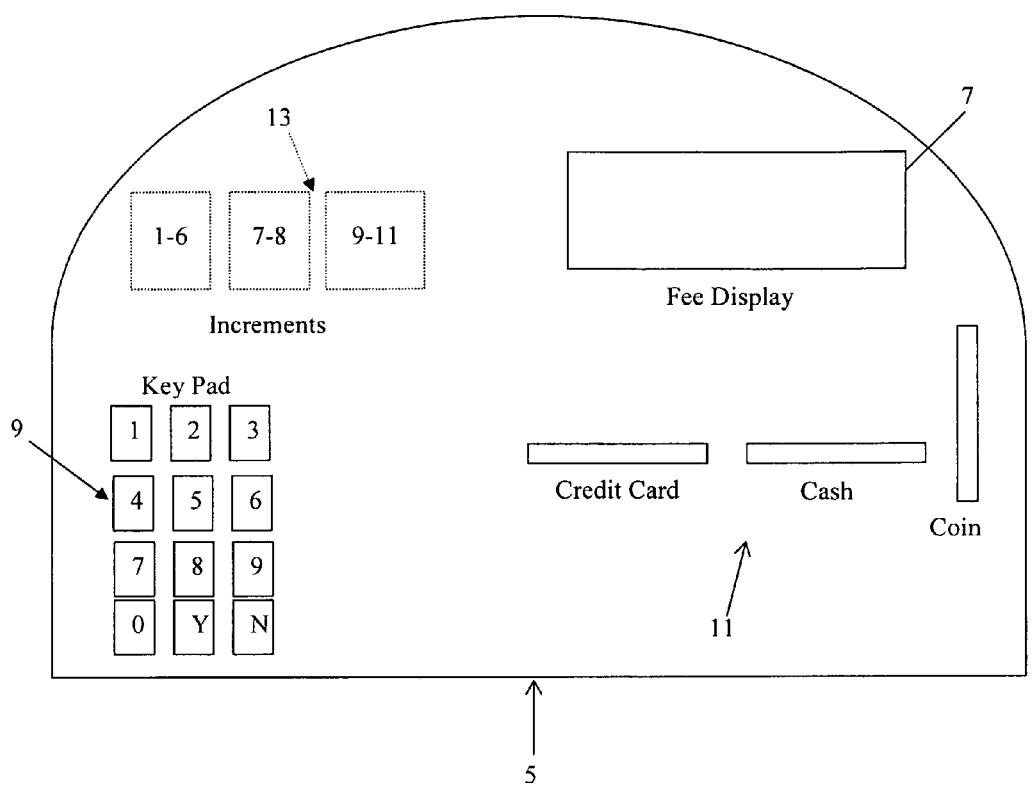
FIG. 2 is a front view of the face of the parking meter embodiment shown in FIG. 1.
Figure 3:
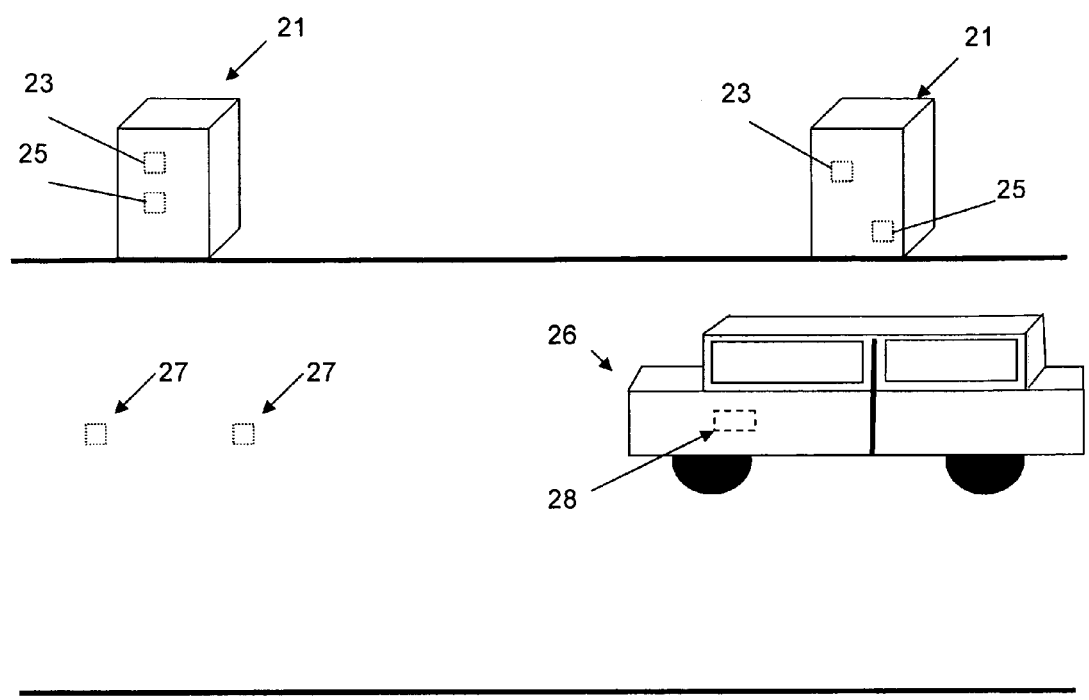
FIG. 3 is a perspective view of a second embodiment of parking meters configured to collect parking fees based on the length of a vehicle.

Other parking meters may be configured to sense the length of a parked vehicle so a vehicle owner or other user need not enter any length measurement input. For example, parking meters 21 shown in FIG. 3 can connect to a measuring device. The measuring device can include one or more sensors 25 and a processor 23. The sensor 25 may be configured to measure the length of a vehicle 26 parked in a selected parking area. Alternatively, the sensor may read a tag or other marking 28 on the side of the vehicle facing the parking meter which is indicated in dotted line in FIG. 2. This tag will have a marking such as a bar code which corresponds to the vehicle length and can be read by the sensor. The processor 23 is operatively connected to the sensor by wiring or other physical or wireless connection devices or connection systems. The processor 23 is configured to receive input from the sensor 25 and calculate the length of the parked vehicle based on the input received from the sensor 25.

In some embodiments of parking meter 21, the processor 23 may also be operatively connected to other sensors 27 that are positioned adjacent the meter 21 and in or near the selected parking area. The sensors 27 are configured to provide input to the processor 23 so the processor can identify the length of the vehicle parked in the selected parking area based on the input received from sensors 25 and 27.

It should be appreciated that the length of a vehicle about to be parked in a parking area or that is parked in a parking area may be determined in various other ways. For example, a parking lot attendant can measure the length of a vehicle using a tape measure or preset hash marks in the pavement or marks on the side of a curb. Those marks could be painted or made with embedments. Of course, other measuring devices configured to measure length may also be used to measure the length of a vehicle.

Figure 4:
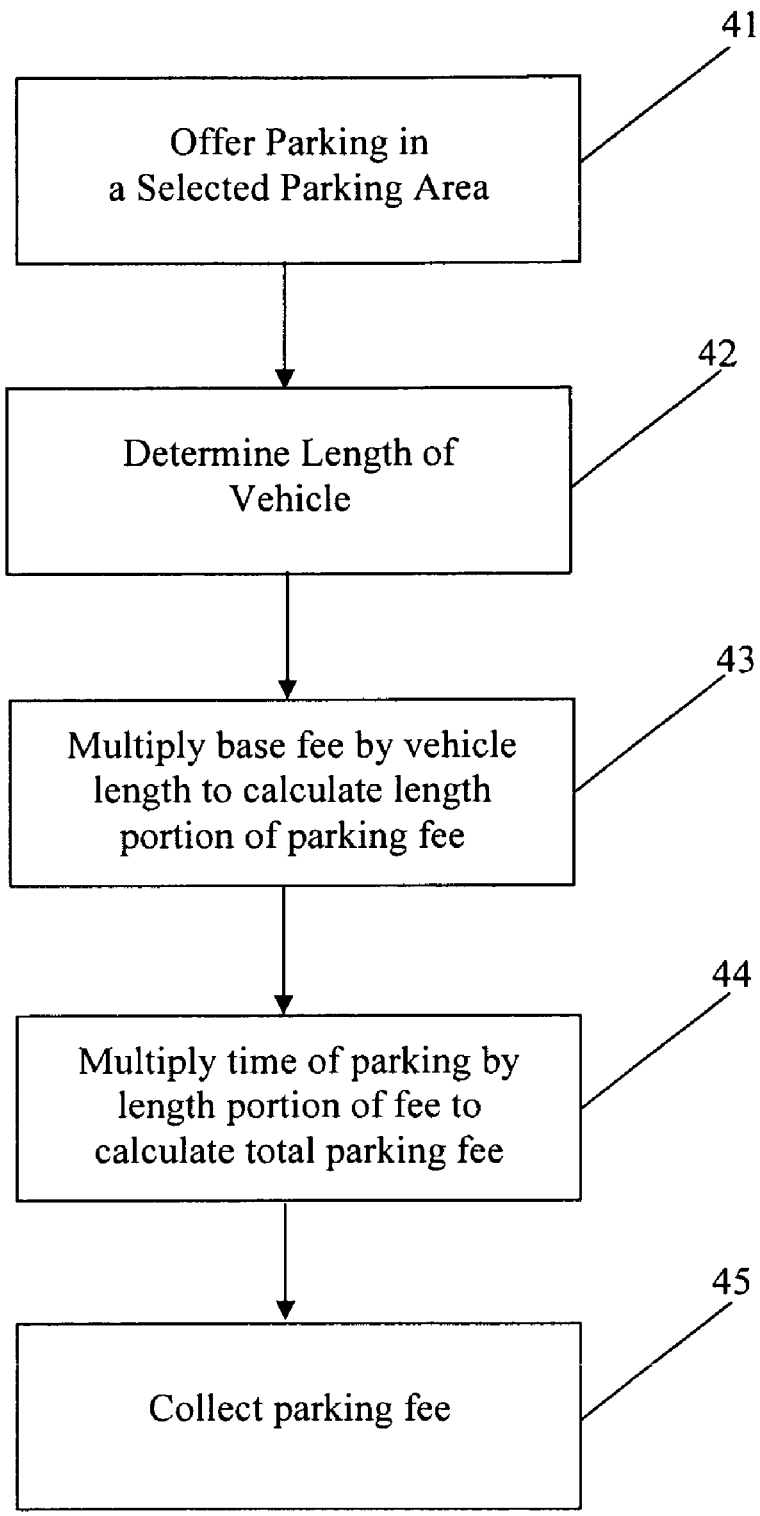
FIG. 4 is a flow chart illustrating a first present preferred embodiment of my method of assessing a parking fee.

Parking meters or other devices configured to collect parking fee payments may be configured to run different programs. One such program may include the method illustrated in FIG. 4. A parking meter may be configured to offer 41 available parking in a selected area. For instance, such an offer may be made by the presence of the parking meter or by indicia or signage on or near the parking meter that indicates parking is permissible adjacent the parking meter. The length of the vehicle parked in the selected parking area may then be determined 42. The measurement of the length may be made by a vehicle owner or parking attendant who measures the length of the vehicle or relies on indicia or markings located in the parking area or by a measurement device connected to the parking meter. Such measurements are then provided to the program. The program may also be configured to multiply a base parking fee by the length of the vehicle to calculate the parking fee or to calculate 43 the length portion of the parking fee. For embodiments that calculate a length portion of the parking fee, the program may be configured to multiply 44 the length portion of the fee with a desired parking time to calculate the parking fee. Such a desired parking time may be ascertained by determining how long a vehicle has parked in the parking area. The program may then be configured to collect 45 the parking fee from the vehicle owner.

Of course, in embodiments that are configured to collect a parking fee for a certain time interval, such as every 10 minutes or every 30 minutes the vehicle is parked in the designated area, the parking meter may be configured to collect payment or prepayment for the parking of a vehicle. Once the payment of the parking fee is collected for a given time interval, such as three 10 minute segments or two 45 minute intervals, the parking meter may be configured to display indicia that indicate that the parking fee has been paid for the paid for time period. The indicia may include a time display that indicates the amount of time remaining before the collected parking fee has been spent such that an additional parking fee is required to permit the vehicle to remain parked in the designated parking area.

Figure 5:
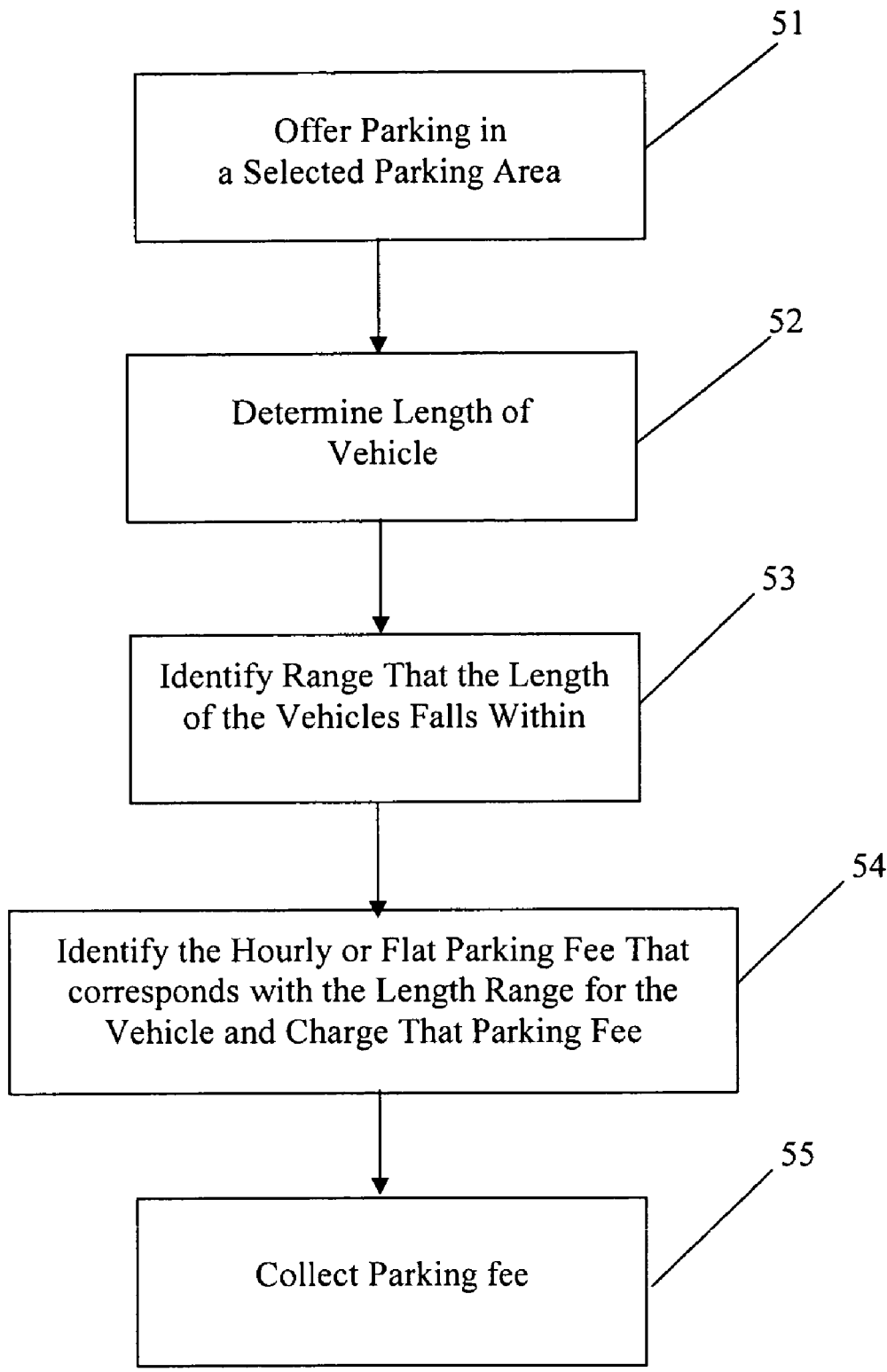
FIG. 5 is a flow chart illustrating a second present preferred embodiment of my method of assessing a parking fee.

In other embodiments, a program may be configured to follow the method illustrated in the flow chart shown in FIG. 5. For instance, a parking lot may have one or more devices configured to follow the method shown in FIG. 5. The parking lot may have an attendant or signage that offers 51 parking in the parking lot or other selected parking area. The length of the vehicle to be parked in the parking area may then be determined 52 by an attendant or a sensing device. The range of lengths the vehicle falls within may then be determined 53. Once the length range is identified, the parking fee value for the length range of the vehicle may be identified 54. The attendant or a parking fee collection device may then collect 55 the parking fee.

While it is anticipated that the present method will be used for parking automobiles, the method is applicable to all types of vehicles including trucks, sport utility vehicles, all terrain vehicles, bicycles, scooters and motorcycles. The method is also not limited to land-based vehicles and could be used for parking, or docking, boats and other watercraft.

While I have shown and described certain present preferred embodiments of my method of assessing parking fees, it is to be distinctly understood that the invention is not limited thereto but may be otherwise variously embodied and practiced within the scope of the following claims.

I claim:

1. A parking meter comprising:
   a housing have a display;
   a data entry device attached to the housing, the data entry device capable of receiving input corresponding to a length of a vehicle;
   a processor within the housing and connected to the data entry device;
   a memory operatively connected to the processor, the memory having a program;
   wherein the program is configured to calculate a parking fee based on input that identifies a vehicle length and display that fee on the display; and
   a payment receipt device within the housing which receives the parking fee.

2. The parking meter of claim 1 wherein the data entry device is a keypad.

3. The parking meter of claim 2 wherein the data input device is a bar code reader.

4. The parking meter of claim 3 wherein the program is configured to determine the vehicle length based on the input and then calculate the parking fee.

5. The parking meter of claim 4 wherein the program calculates the parking fee based on what predetermined length range the vehicle length falls within.

6. The parking meter of claim 1 wherein the data entry device reads a vehicle registration tag containing information corresponding to length of the vehicle.

* * * * *